United States Patent [19]
Halberschmidt et al.

[11] 3,769,133
[45] Oct. 30, 1973

[54] METHOD FOR MANUFACTURE OF LAMINATED SHEET MATERIAL

[75] Inventors: Friedrich Halberschmidt, Merkstein; Karl Heinz Linberg, Horbach; Werner Nuding, Ludwigsburg; Hans Steffens, Aachen, all of Germany

[73] Assignee: Saint-Gobain, Neuilly-sur-Seine, France

[22] Filed: Aug. 31, 1970

[21] Appl. No.: 68,065

[30] Foreign Application Priority Data
May 21, 1970 Germany............... P 20 24 781.8

[52] U.S. Cl................. 156/286, 156/104, 156/382
[51] Int. Cl............................................. B32b 17/10
[58] Field of Search.................... 156/285, 286, 104, 156/107, 382; 53/9, 8

[56] References Cited
UNITED STATES PATENTS

| | | | |
|---|---|---|---|
| 3,405,019 | 10/1968 | Seil et al. | 156/382 X |
| 3,461,337 | 8/1969 | Lotz | 53/9 X |
| 2,676,440 | 4/1954 | Campbell | 53/9 |
| 3,575,756 | 4/1971 | Maus | 156/286 |
| 2,783,176 | 2/1957 | Boicey | 156/286 |
| 3,307,999 | 3/1967 | Boicey | 156/104 X |
| 2,673,822 | 3/1954 | Dennison et al. | 156/104 |
| 3,493,451 | 2/1970 | Beery | 156/286 X |
| 3,042,574 | 7/1962 | Hochberg | 156/286 |
| 2,621,129 | 12/1952 | Ramsbottom | 156/286 X |

*Primary Examiner*—Ralph S. Kendall
*Attorney*—Pennie, Edmonds, Morton, Taylor and Adams

[57] ABSTRACT

Method and apparatus for the manufacture of laminated sheets, such as outer laminae of glass with interposed lamina of thermoplastic. The superposed laminae are placed in an envelope having at least one wall flexible. The envelope has at least one side edge open but is otherwise air-tight. The laminae and envelope are placed in an evacuable chamber such as an autoclave. The air pressure is reduced to a few mm of Hg thus degassing the laminar sandwich. The open side edge of the envelope is then sealed while within the autoclave, under low absolute pressure. The assembly of envelope and laminae are then processed under heat and pressure, to unite the laminae into a unitary sheet. The processing may be done while the assembly remains in the autoclave. The completed sheet may be left in its envelope until removed for use.

12 Claims, 2 Drawing Figures

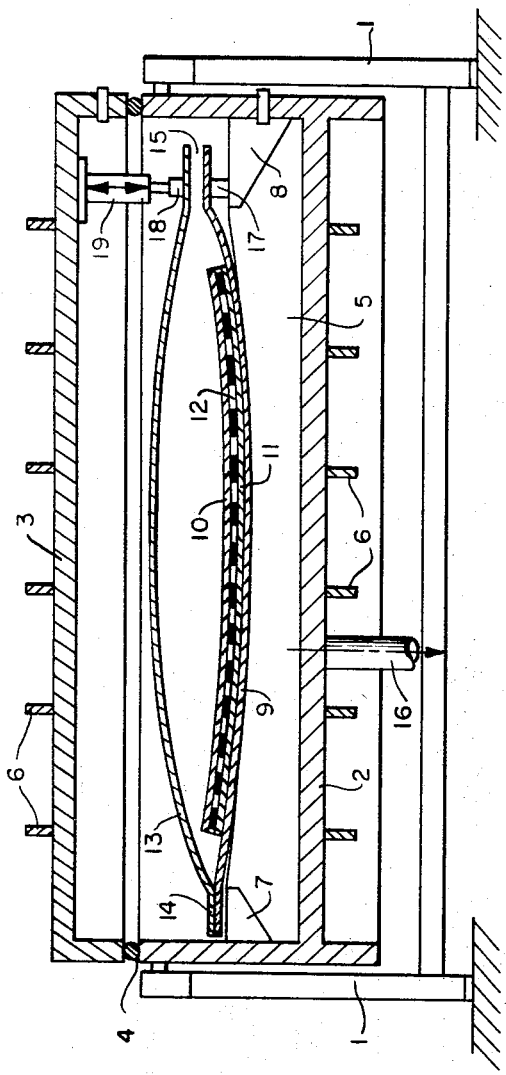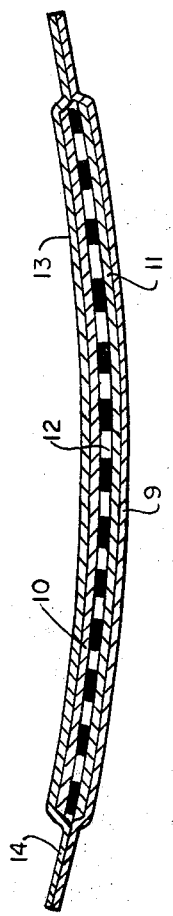

METHOD FOR MANUFACTURE OF LAMINATED SHEET MATERIAL

CROSS-REFERENCE TO RELATED APPLICATION

In application Ser. No. 10,911, filed Feb. 12, 1970, in the names of Georges Oustin and Helmut Krumm, assigned to the assignee hereof there is taught a method wherein, after stacking or superposing the several laminae which are to be united into a composite sheet, they are confined within a flexible sack or enclosure which is then placed under vacuum both interiorly and exteriorly at different values of sub-atmospheric absolute pressures. The two pressures are not necessarily applied simultaneously but may be applied sequentially.

BACKGROUND OF THE INVENTION

The invention relates to method and apparatus for the production of laminated sheets such as those wherein the individual laminae of glass or plastic material, transparent or otherwise, are united in superposed or sandwich relation by an interposed layer of thermoplastic, under the action of heat and pressure. Prior to uniting of the superposed laminae the assemblage must be degassed under low absolute pressure of a few millimeters of mercury.

SUMMARY OF THE INVENTION

The discrete assembled or superposed laminae are placed in an envelope of flexible material which is left open on at least one side edge thereof. The envelope with its contained layers or laminae to be united, and with at least one side edge open, is then placed in an air-tight chamber from which air is then exhausted. Since the envelope is or remains open the reduction in absolute pressure, or vacuum, within the chamber also results in an essentially corresponding vacuum within the envelope and results in degassing of the assembled laminae. After degassing has been completed the formerly open side edge of the envelope or sack is closed and sealed while within the chamber which remains temporarily under vacuum. The envelope or sack may be impervious thin sheet plastic material.

The resulting degassing of the laminae is of very high quality. Further, the assembled and united layers are not required to be removed from the envelope but, to the contrary, may be left therein for protection. The method also effects an assured permanent seal along the borders of the completed sheet so that all precautions formerly necessary to effect such a seal, may be dispensed with.

The superposed laminae still enclosed within the sack are then subjected to heat and pressure by known procedures, using air or other appropriate fluid to effect their adhesion and coherence into a unitary article. The article may be left within the sealed sack until actual use. The sack forms an encasement which protects the completed sheet or article against scratches and soiling during subsequent treatments and, indeed, right up to the time it is removed for installation in a motor vehicle or other use. Further, the method results in the elimination of costly and time-consuming cleaning procedures formerly necessary.

After degassing of the assembly under vacuum, and closure of the envelope or sack to retain the vacuum therein, the envelope and its contents are subjected externally to ambient atmospheric pressure. This obviates any sliding or slipping of the superposed laminae, one with respect to the others. The material of which the envelope is made may be transparent, in which case there is another advantage in that the stacked laminae may be visually inspected not only while under vacuum but also during all subsequent steps. It is also clear that in accordance with the present invention the assembled and completed sheet, within its sealed envelope, is protected against the entrance of moisture and changes in humidity which might otherwise deleteriously affect the adhesion together of the laminae. Further, the inventive method materially shortens the time required by prior art procedures, and greatly facilitates automation of the entire method from the time the discrete laminae are superposed until they are united and fully processed. All of the foregoing advantages accrue with apparatus of relatively low cost.

Another feature of great importance is that the envelope containing the assembled superposed laminae may be sealed while enclosed within the chamber and under vacuum. It is convenient to employ an envelope or sack open along one edge, which edge is sealed within the chamber after degassing therein under vacuum. Of course the envelope may also be open along two sides both of which are sealed while the envelope and its contents are under vacuum within the chamber. It is also possible and within the purview of the invention, to employ as an envelope a single strip or length of flexible material doubled on itself. In such case the material is sealed under conditions previously described, along all three initially open side edges.

Likewise two separate and discrete but superposed sheets of material may be used as an envelope and all four edges thereof sealed together while under vacuum, to thus completely enclose and seal the laminae to be cohered.

In accordance with the embodiment described in the immediately preceding paragraph, one of the two sheets may be a double layer sheet with the two layers of different materials. The other sheet may be of greater mechanical strength and resistance and may be sealed along its edges to the first sheet, under pressure and a temperature of about 140° C. At least one layer of the double layer sheet is impervious to the passage therethrough of gas. Of course, the one layer of the double layer sheet which is in contact with the lamina of glass or like material, must be of a material incapable of cohering to the glass. An eminently satisfactory combination of materials is for said one sheet polyamid for the external layer and polypropylene for the internal layer. The aforesaid other sheet of greater mechanical strength may be of thin metal such as aluminum.

It is decidedly advantageous to provide interiorly of the evacuation chamber, means for pressing against the upper surface of the envelope. In this way excessive expansion of the envelope is avoided while the absolute pressure within the chamber is being reduced, and undesirable wrinkling of the envelope material is avoided when atmospheric pressure is restored within the chamber.

BRIEF DESCRIPTION OF THE DRAWING

FIG. 1 is a transverse vertical section through an apparatus for carrying out the method and showing the positions of the parts during degassing; and FIG. 2 is a view to an enlarged scale, showing the completed sheet, under vacuum within its envelope or sack.

DESCRIPTION OF THE PREFERRED EMBODIMENT

A frame 1 supports a housing 2 provided with a cover 3 which can be secured over the rim of the housing and form therewith, by means of resilient gasket 4, a pressure-tight chamber 5. The enclosure thus shown schematically may be an autoclave equipped with means to reduce the interior pressure to a very low absolute value and also, as in the application above identified, having means to heat the interior and to raise the pressure to a relatively high value above atmospheric.

Within chamber 5 there is mounted as by means of brackets 7, 8, a flexible support 9 which forms the lower sheet of the envelope for the assembled superposed laminae to be united and which in this case are shown as upper and lower laminae 10, 11, respectively, of glass, and a layer of thermoplastic material 12 interposed between. The three laminae which are simply laid one on the other in sandwich form, are placed in the envelope formed by the aforesaid lower supporting sheet 9 and an upper double layer of sheet material of which the top one may be polyamid and the lower or interior one of polypropylene. Means not shown continuously force cover 3 onto gasket 4. Ribs 6 integral with the cover and housing reinforce them and enable them to withstand both low subatmospheric pressures as well as high superatmospheric pressures.

In the apparatus shown the envelope is formed by sealing together upper and lower elements 9 and 13, along three side edges, as indicated at 14. The fourth edge is left open as at 15 and forms the entrance through which the laminae 10, 11, 12 are introduced into their envelope.

After the assembly 9 through 13 is in place within chamber 5 and cover 3 is emplaced and sealed, air is withdrawn by a pump not shown, connected with pipe fitting 16, in communication with chamber 5. Evacuation is continued until the absolute pressure within the chamber is down to a few millimeters of Hg. Since the envelope or sack is still open at edge 15, the absolute pressure within it will be essentially but not quite, the same as that within the chamber. Thus the assembled layers 10, 11, 12 are rapidly and completely degassed. The absolute pressure within the sack, being slightly greater than that in chamber 5, the sack is distended about as illustrated in FIG. 1, thus allowing free degassing of the assembly. However, since layer 13 is very flexible it is easily pressed flat against upper lamina 10 when, after sealing of the sack or envelope while under vacuum or low absolute pressure, chamber 5 is restored to atmospheric pressure and/or subjected to superatmospheric pressure.

As soon as the desired vacuum is attained within chamber 5 and envelope 9, 13, the degassing is completed and the envelope is closed and sealed. This latter step is effected by and between two ledges or abutments, a lower one 17 which is fixedly mounted within chamber 5, and an upper one 18 which is mounted for vertical guided translation by means of a pressure cylinder and piston generally indicated in its entirety at 19. The ledges or abutments are substantially coextensive with and in linear registration with the open edge 15 of the envelope. These ledges may be electrically heated by means not shown.

Thus when item 18 is forced downwardly toward 17 the initially open edge 15 is closed; and when these ledges are heated by the passage of current through them, the edge is hermetically sealed and the envelope thus made air tight.

Immediately after, the pressure within the autoclave or space 5 is restored to atmospheric. The sack is thus collapsed against the superposed layers 10, 11, 12, as shown upon FIG. 2, so that these are thereby pressed together and firmly held against slippage in directions parallel with their planes. Then the final coherence or adhesion of and between those layers is completed in a conventional manner. This may be done while the assembly of parts 9 through 13 is within the autoclave, as by the application of heat and superatmospheric pressure. In the formation of a sheet wherein the intermediate layer 12 is of thermoplastic such as polyvinylbutyral and the outer layers or laminae are of glass, final coherence and union of the laminae may be effected at a temperature of about 140° C., under a pressure of between about 4 and 10 atmospheres.

As numerous modifications and substitutions will readily occur to those skilled in the art, after a study thereof, the foregoing disclosure is to be taken in an illustrative rather than a limiting sense. The method and apparatus are equally useful whether the completed sheet is planar or curved in one or more planes.

We claim:

1. The method of fabricating a laminated sheet of material, comprising, forming a sandwich of at least two laminae adherable together, placing the sandwich in an envelope of flexible, gas-impervious material and having an opening therein, to thereby form an assembly, placing the assembly within an evacuable chamber, the interior of the envelope being in communication with the chamber through said opening, evacuating the chamber to reduce the pressure within the chamber and envelope to a low subatmostpheric absolute value, adhering the edge portions of the evacuated envelope surrounding said opening within the chamber to seal the opening and render the envelope air tight, heating the chamber and its contents to the sealing temperature of the sandwich, and increasing the absolute pressure within the chamber around the envelope to at least atmospheric.

2. The method of claim 1, said sealing of the envelope opening being effected by the application to said edge portions of heat at a temperature in excess of the sealing temperature of the sandwich.

3. The method of claim 1, said assembly being subjected to superatmospheric absolute pressure while confined within the chamber during said heating of the chamber.

4. The method as defined in claim 1 wherein the forming of the sandwich comprises assembling two sheets of material of complementary shape in face to face relation and an intermediate layer of thermoplastic material therebetween.

5. A method as defined in claim 4 wherein said intermediate layer is polyvinyl butyral.

6. The method of fabricating a laminated sheet of material, comprising, forming a sandwich of at least two laminae which may be conjoined by heat and pressure, inserting the sandwich in a flexible sack comprising thermo-sealing material open along an edge to leave a loading opening, said sack being of material impervious to gas, placing the assembly of sack and sandwich within an evacuable chamber, evacuating the chamber and thereby reducing the pressure within the sack to a low subatmospheric absolute value, sealing the opening in the evacuated sack by heat to make it air tight, heating the chamber to the sealing temperature of the sandwich and increasing the absolute pressure within the chamber to at least atmospheric pressure, and cooling the assembly.

7. The method as defined in claim 6 wherein the sack comprises two sheets sealed to one another at the edges thereof.

8. The method of claim 7 in which a sheet of the sack comprises metal.

9. The method of claim 7 in which a sheet of the sack comprises inner and outer superposed layers.

10. The method of claim 9 in which the inner layer is polypropylene.

11. The method as defined in claim 9 wherein the said outer layer is polyamide.

12. The method as defined in claim 6 wherein the inner surface of the sack comprises material which will not adhere to the lamina of the sandwich adjacent thereto at said sealing temperature of the sandwich.

* * * * *